(12) United States Patent
Gillich et al.

(10) Patent No.: US 6,670,045 B1
(45) Date of Patent: Dec. 30, 2003

(54) REFLECTOR WITH A RESISTANT SURFACE

(75) Inventors: Volkmar Gillich, Neuhausen am Rheinfall (CH); Renato Kirin, Thayngen (CH); Roman Fuchs, Schaffhausen (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/554,165

(22) PCT Filed: Nov. 12, 1998

(86) PCT No.: PCT/CH98/00487

§ 371 (c)(1),
(2), (4) Date: May 10, 2000

(87) PCT Pub. No.: WO99/27394

PCT Pub. Date: Jun. 3, 1999

(30) Foreign Application Priority Data

Nov. 19, 1997 (EP) .............................. 97810881

(51) Int. Cl.⁷ ............................... B32B 15/04
(52) U.S. Cl. .............. 428/469; 428/448; 428/450; 428/458; 428/650; 428/654; 428/701; 428/702; 428/908.8; 428/699; 427/163.1
(58) Field of Search ................. 428/469, 631, 428/632, 650, 702, 654, 450, 448, 458, 699, 701, 908.8; 427/163.1

(56) References Cited

U.S. PATENT DOCUMENTS

| | | |
|---|---|---|
| 5,216,551 A | 6/1993 | Fujii |
| 5,403,657 A | 4/1995 | Textor et al. |
| 5,424,876 A | 6/1995 | Fujii |
| 5,527,562 A | 6/1996 | Balaba et al. |
| 5,527,572 A | 6/1996 | Textor et al. |
| 5,582,863 A | 12/1996 | Textor et al. |
| 5,583,704 A | 12/1996 | Fujii |
| 5,663,001 A | 9/1997 | Textor et al. |

FOREIGN PATENT DOCUMENTS

| | | |
|---|---|---|
| EP | 0456488 | 11/1991 |
| EP | 0495755 | 7/1992 |
| EP | 0568943 | 11/1993 |
| GB | 1507532 | 4/1978 |
| GB | 2267509 | 12/1993 |
| GB | 2292751 | 6/1996 |
| WO | Wo 97/01775 | 1/1997 |

OTHER PUBLICATIONS

Hass et al., *Applied Optics*, vol. 14, No. 11, (Nov. 1975), pp. 2639 to 2644.

Primary Examiner—Deborah Jones
Assistant Examiner—Andrew Piziali
(74) Attorney, Agent, or Firm—Fisher, Christen & Sabol

(57) ABSTRACT

A reflector, with high total reflection, resisting mechanical stress, and having a reflector body on which the following components are superimposed (a) a functional coating, e.g., a varnish, (b) a reflection layer structure composed of a reflecting metallic layer and, optionally, one or more transparent ceramic layers, having for instance an optical depth of $\lambda/2$, applied on the top of the metallic layer. The reflection layer structure is a protection layer as a surface layer. The protection layer is a silicon oxide of general formula $SiO_x$ where x is a number from 1.1 to 2.0, or is an aluminum oxide of formula $Al_2O_3$, with a thickness of 3nm or more. The protection layer protects the underlying layers from mechanical stresses. In the DIN 58196 wipe test, the protected layer shows no damage after 50 test cycles, each with 100 wiping strokes. These reflectors are useful in the field of lighting and illumination where they can be used for lighting of display units with screens, primary lighting, secondary lighting, raster lighting, light ceilings or light deflector lamella.

27 Claims, No Drawings

REFLECTOR WITH A RESISTANT SURFACE

This is a 371 of PCT/CH98/00487, filed on Nov. 12, 1998, that has benefit of European Patent Application 97810881.9, filed on Nov. 19, 1997.

BACKGROUND OF THE INVENTION

The invention relates to a reflector with high total reflection, resisting mechanical stress and comprising a reflector body of metal and arranged thereon superimposed,

BACKGROUND ART a) a functional coating, made of a gel-film, lacquer or polymer of thickness 0.5 to 20 μm or, in the case of a reflector body of aluminium, also of anodically oxidised aluminium formed directly out of the aluminium lying on the surface of the reflector body, of thickness 10 to 1500 nm, and b) a reflection layer structure composed of a reflecting layer and a plurality of transparent layers.

The invention also concerns the use of such reflectors.

It is generally known to produce strips of highly reflective materials such as e.g. high purity aluminium or AlMg alloys based on aluminium with a purity level of 99% and higher, such as e.g. 99.5%, and to produce roll surfaces that create diffuse or directional reflection, depend-ing on the application. It is also known, in order to increase the directional reflection (degree of reflection), to brighten the surfaces of such strips chemically or electrolytically and sub-sequently to provide them with a protective, e.g. 1.5 μm thick layer by anodic oxidation.

The known processes have the further disadvantage that high purity and expensive alloys based on high purity aluminium have to be employed. The anodic oxide layer causes the degree of reflection to be lowered and, as a result, both the total reflection and the directional reflection, due to absorption and diffuse light scattering, in particular in the oxide layer. This represents a loss of energy.

Known from EP-A-0 495 755 are items with surfaces of aluminium which are suitable for depositing layer systems from the gas phase onto these surfaces. Anodising the surface is dispensed with and a layer system is described comprising e.g. an adhesive layer, such as a ceramic layer, a light reflecting layer, such as a metallic layer e.g. of aluminium and one or more transparent protective layers e.g. of the oxides, nitrides or fluorides of magnesium, titanium or praseodymium. Such layer systems exhibit a high degree of reflection. Such a layer system, however, has the disadvantage of being very sensitive to mechanical effects.

BROAD DESCRIPTION OF THE INVENTION

EP-A-0 586 943 describes the precipitation of a reflection layer which is based on aluminium and superimposed on this a gel film that has been deposited on the aluminium by a sol-gel process. The reflection is achieved by a layer system comprising layers of silicon oxide, metal, silicon dioxide and titanium dioxide. This is also a possibility for achieving reflecting aluminium-based materials. The layer structure described in EP-A 0 568 943 is not resistant to mechanical stress to the desired degree.

The document WO 97/01775 describes bent reflectors with a reflector body of glass and provided thereon a primary layer of silicon or silicon and stainless steel and, situated on top of that, a reflecting metal layer which is covered by a protective layer e.g. of silicon-nitride.

Known from EP-A-O 456 488 are reflectors having a foundation and a reflecting layer provided thereon and a subsequent layer system comprising high and low refractive index layers, where the reflecting layer is deposited directly on the substrate or on a dielectric layer. The layer system may be covered by a protective layer.

The object of the present invention is to avoid the above mentioned disadvantages and to propose reflectors with outer layers that are insensitive to external mechanical stress and are characterised by a high resistance to wiping.

That objective is achieved by way of the invention in that the reflection layer structure comprises a silicon oxide of general formula $SiO_x$ where x represents a number from 1.1. to 2.0, or aluminium oxide having the formula $Al_2O_3$, of thickness 3 nm (nanometre) or more as protective layer and the protective layer as the layer lying on the surface protects the under-lying layers against mechanical damage and the protective layer exhibits no surface damage in the wipe test according to DIN 58196 after 50 test cycles each of 100 wiping strokes.

DETAILED DESCRIPTION OF THE INVENTION

In the present invention the protective layer basically belongs to the transparent layers within the structure of reflection layers.

In one useful version the minimum thickness of the protective layer amounts to 3 nm. The maximum thickness of the protective layer may e.g. be 1000 nm, advantageously 400 nm. In another version the thickness of the protective layer is preferably 40 nm or less. In particular the thickness of the protective layer is 3 to 20 nm. In the present description of the invention the letters nm stand for nanometre.

In a further version the thickness of the protective layer can also be defined by its optical thickness (or depth). The optical thickness is preferably described by the formula $n \cdot d = \lambda/2 \pm 40$ nm. The optical thickness may also be a multiple thereof expressed by k, where k is a natural number such as 2, 3, 4, 5, 6. 7, 8, 9 or 10. In this formula n stands for the index of refraction and d the geometric thickness. The symbol $\lambda$ stands for the intensity maximum of the wave lengths of the reflected electromagnetic radiation. In the case of visible light $\lambda$ lies in the region of approximately 550 nm.

The reflecting body in question may be any three-dimensional object having at least one free surface of a metal, such as iron, steel, aluminium or aluminium alloy. These free surfaces may be an aluminium with a purity of 98.3% and higher in certain cases with a purity of for example 99.0% and higher, 99.7% and higher, 99.9% and higher or 99.95% and higher. Apart from aluminium of the above mentioned purities the surface may also be of an alloy. Preferred alloys are those belonging to the AA 1000, AA 3000 and AA 5000 series. Further preferred alloys contain e.g. 0.25 to 5 wt. % magnesium, in particular 0.5 to 4 wt. % magnesium, or 0.2 to 2 wt. % manganese, or 0.5 to 5 wt. % magnesium and 0.2 to 2 wt. % manganese, in particular e.g. 1 wt. % magnesium and 0.5 wt. % manganese, or contain 0.1 to 12 wt. % copper, preferably 0.1 to 5 wt. % copper, or contain 0.5 to 6 wt. % zinc and 0.5 to 5 wt. % magnesium, or contain 0.5 to 6 wt. % zinc, 0.5 to 5 wt. % magnesium and 0.5 to 5 wt,% copper, or contain 0.5 to 2 wt. % iron and 0.2 to 2 wt. % manganese, in particular e.g. 1.5 wt. % iron and 0.4 wt. % manganese or AlMgSi alloys or AlFeSi alloys. Further examples are AlMgCu alloys such as Al99.85Mg0.8Cu or AlMg alloys such as AlMg1.

Especially preferred free surfaces are e.g. of aluminium having a purity of 99.5 % and higher, 99.8% and higher, 99.85% and higher or surfaces of an aluminium alloy containing 0.5 wt. % magnesium or containing 1 wt. % magnesium, or containing aluminium having a purity of 99% and 5 to 10 wt % magnesium, in particular 7 wt. % magnesium and 6 to 12 wt. % copper, in particular 8 wt. % copper. Especially preferred are also all aluminium alloys that can be rolled.

Examples of reflector bodies are castings and forgings and, in particular, rolled products such as foils, strips, plates, sheets that may be shape-formed by bending, deep-drawing, cold impact extrusion and the like. Further, extrusions, beams or other shapes may be employed.

Depending on the application in question, the whole reflector body may be made of metal, preferably of the above mentioned aluminium or aluminium alloy; it is possible for only parts or only parts of the surface area to be of metal.

The above mentioned metal and in particular the aluminium or aluminium alloy may also be part or a part of a surface of a composite e.g. a laminated foil or laminates of any material of choice such as e.g. plastics or and metals such as Al-coated steel sheet or Al-coated plastic.

The aluminium surfaces may also be subjected to a chemical or electrochemical process or an alkaline pickling process. Such brightening or pickling processes are employed prior to anodising.

The aluminium surfaces may, for any topography of choice, exhibit a surface roughness $R_a$ of e.g. 0.01 to 5 µm, preferably from 0.01 to 0.5 µm. Further preferred, advantageous $R_a$ roughness values are from 0.01 to 0.4 µm and in particular from 0.03 to 0.06 µm, whereby 0.04 µm is especially suitable. The surface roughness characteristic $R_a$ is defined in at least one of the DIN standards 4761 to 4768.

In the case of the present reflectors at least one pre-treatment layer may be provided between the reflector body and the functional coating a).

In the case of a reflector body made mainly out of ferrous based metal, the pre-treatment layer may be a layer made by phosphate or chromate treatment or by zinc plating. In the case of a reflector body made of aluminium the pre-treatment layer may be a layer formed by chromate or phosphate treatment or by anodising. The pre-treatment layer is preferably made of anodised aluminium and is created directly out of the aluminium on the surface of the reflector body. The pre-treatment layer may have a thickness e.g. of at least 10 nm, usefully 20 nm, particularly useful is a thickness of at least 50nm, preferably at least 100 nm and especially preferably at least 150 nm. The greatest thickness of the pre-treatment layer may e.g. be 1500 nm, preferably 200 nm. The pre-treatment layer has therefore a thickness of preferably 100 nm to 200 nm.

For example the pre-treatment layer may be an anodic oxide layer formed in a redisolving or non-redisolving layer electrolyte. The pre-treatment layer may also be a yellow chromate layer, a green chromate layer, a phosphate layer or a chrome-free pre-treatment layer which is formed in an electrolyte containing at least one of the elements Ti, Zr, F, Mo or Mn.

The functional coating a) is deposited directly onto the reflector body or—if present—on the pre-treatment layer. In the case of an anodic oxide layer the aluminium oxide layer formed by anodising may form the functional coating.

For example, the functional coating a) exhibits a thickness of 0.5 to 20 µm, usefully 1 to 20 µm, preferably 2 to 10 µm and especially preferably 2 to 5 µm. If the aluminium oxide layer formed by anodising forms the functional coating a), then its thickness, as mentioned above, is from 20 to 1500 nm.

The functional coating a) may e.g. be a gel film deposited using a sol-gel process. Further functional coatings a) are lacquers or polymers, thereby advantageously vacuum resistant lacquers and polymers, polyesters, epoxy, polycarbonates, acrylic, polyvinylchloride, poly-vinyl-fluoride, polyvinylidenfluoride etc.

The gel film may be a coating with organo-functional silanes of a metal compound and may e.g.

A) have been obtained by hydraulic condensation of the following components, if desired in the presence of a condensation catalyst and/or the normal additives:
  1. at least with one cross-linkable organo-functional silane of a compound having the formula (II):

  $$R'''_m SiX_{(4-m)} \qquad (II)$$

in which the groups X, which may be the same or different, represent hydrogen, halogen, alk-oxy, acyloxy, alkylcarbonyl or —NR"2(R"=H and/or alkyl) and the radicals R''', which may be the same or different, represent alkyl, alkenyl, alkinyl, aryl, arylalkyl, alkylaryl, arylalkenyl, alkenaryl, arylalkinyl or alkinylaryl, where these radicals may be interrupted by O or S atoms or by the group —NR" and one or more substituents from the group of halogens and may, if desired, bear the substituted amino, amide, aldehyde, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups, and m has the value 1, 2 or 3, and /or with an oligomer derived therefrom, whereby the radical R''' and/or the substituent must be a cross-linkable radical or substituent, of an amount equal to 10 to 95 mol. %, with reference to the total mol number of the (monomer) starting components;

2. at least of one metal compound having the general formula III:

  $$MeR_y \qquad (III)$$

In which Me is a metal from the group comprising Al, Zr, Ti, where y in the case of aluminium is 3 and in the case of Ti and Zr is 4 and the radicals R, which may be the same or different stand for halogen, alkyl, alkoxy, acyloxy or hydroxy, where the just mentioned groups may be partially or wholly replaced by chelate ligands and/or with an oligomer and/or, if desired, a complex aluminium salt of an inorganic or organic acid, in an amount of 5 to 75 mol %, with reference to the total mol number of the (monomer) starting components, 3. if desired, at least with one non-cross-linkable organo-functional silane having the formula I:

  $$R'_m SiX_{(4-m)} \qquad (I)$$

in which the groups X, which may be the same or different, stand for hydrogen, halogen, hydroxy, alkoxy, acyloxy, alkylcarbonyl or —NR"2(R"=H and/or alkyl) and the radicals; R', which may be the same or different, represent alkyl, aryl, arylalkyl or alkylaryl, whereby these radicals may be interrupted by O or S atoms or by the group —NR', and one or more subtituents from the group of halogens and may, if desired, bear the substituted amide, aldehyde, keto, alkylcarbonyl, carboxy, cyano, alkoxy, alkoxycarbonyl groups, and m has the value 1, 2 or 3, and /or with an oligomer derived therefrom, in an amount equal to 0 to 60 mol. %, with reference to the total mol number of the (monomer) starting components;

4. if desired, with one or more low-volatile oxides of an element of an element of the main group Ia to Va or the sub-groups IIb, IIIb, Vb to VIIIb of the periodic system with the exception of aluminium, which is/are soluble in the reaction medium, and /or one or more compounds of one of these elements which, under the reaction conditions, forms a low volatile oxide, in an amount of 0 to 70 mol %, with reference to the total mol number of the (monomer) starting components; and B) such that an organic pre-polymer is added to this hydrolytic condensate, whereby the reacting cross-linkable groups of the radical R''' and/or the cross-linkable substituents on the radical R''' can be cross-linked with those on the pre-polymer, or to advantage are of the same name, and the pre-polymer is added in an amount of 2 to 70 mol %, with reference to the total mol number of the (monomer) starting components;

C) the coating solution thus obtained is deposited onto a substrate, in particular onto the reflector body or the pre-treatment layer thereon, and subsequently hardened.

Further details and information concerning the functional coatings a) in the form of a gel-film may be found in EP-A 0 610 831 and EP-A 0 358 011.

The above mentioned silanes may be replaced by compounds which contain titanium, zirconium or aluminium instead of silicon. This way the hardness, density and refractive index of the functional coating may be varied. The hardness of the functional coating may also be controlled by use of different silanes, e.g. by forming an inorganic network to control the hardness and thermal stability, or by use of an organic network to control the elasticity. A functional coating, which may be provided between the inorganic and organic polymers, is deposited on the aluminium substrates e.g. via a sol-gel process by specific hydrolysis and condensation of alkoxides, principally those of silicon, aluminium, titanium and zirconium. In the process an inorganic network is created and, via appropriate derivated silicate esters, additional organic groups can be incorporated therein which on the one hand are employed for functional purposes and, on the other hand, are used to create defined organic polymer systems. Furthermore, the gel film may also be deposited by electro-immersion using the principle of catephoric deposition of an amine and organically modified ceramic.

The functional coating a), as the above mentioned silanes or the above mentioned lacquers, may be deposited by immersion, brush application, roll deposition, centrifugal application, spraying, so called coil coating etc. onto the reflector body directly or over a pre-treatment layer.

After coating the anodised surface of the reflector body with the functional coating a), the coating can be hardened. The hardening may take place by radiation such as UV-radiation, electron beam radiation or laser beam radiation and/or at elevated temperature. The temperature may raised by convection or thermal radiation such as infra-red and/or ultra-violet radiation, or by a combination of convection and thermal radiation such as UV and/or IR radiation or using hot gas such as hot air. The temperature, measured at the layer below the functional coating e.g. the metal layer such as the aluminium layer is greater than 110° C., usefully greater than 150° C. and preferably between 150 ° C. and 240° C. For clear lacquers these temperatures are e.g. often 230° C. to 240° C. The elevated temperature may e.g. be applied to the reflector body for 10 to 120 min. The convection heating may usefully be performed by applying heated gases, such as air, nitrogen or mixtures thereof.

The functional coating a) effects a levelling or smoothing of the surface. $R_a$ values for example of less than 0.01 $\mu$m and preferably less than 0.02 $\mu$m are achieved. The surface roughness $R_a$ is defined in at least one of the DIN standards 4761 to 4768.

The functional coating a) may be a single layer i.e. a monolayer or a multiple layer, such as e.g. a double layer, triple layer etc. The multiple layers such as the double layers or triple layers may all be of the same material or of different materials, each selected from the above mentioned materials for functional coatings a). The double layer coating, triple layer coating etc. may be formed e.g. by depositing first one layer, pre-hardening or hardening the first layer, depositing the second layer and hardening the second layer. A first layer which has only been pre-hardened may be hardened along with the second layer. Should a third layer be deposited, then the first and the second layers may be hardened or pre-hardened, and the hardening may concern only the third layer or the hardening of the underlying layers—provided this is still necessary—may be performed along with the hardening of the third layer. Analogously, the same applies for further layers e.g. a fourth layer etc. Preheating includes processes such as allowing to dry, pre-drying under the influence of heat or radiation, or the application of radiation or heat treatment. The useful thickness of a double or triple layer lies in the above mentioned range of 1 to 20 $\mu$m, whereby each individually deposited layer may have a thickness e.g. of 2 to 5 $\mu$m.

The reflecting layer structure b) contains a reflecting layer such as e.g. a layer of aluminium, silver, gold, chromium, nickel or alloys, e.g. containing mainly at least one of these metals. The thickness of the reflecting layer may e.g. amount to 10 to 200 nm (nanometre). As a rule the reflecting layer is applied directly onto the functional coating a) or onto an inter-mediate bonding layer.

Further, the reflecting layer structure b) contains a plurality of transparent layers. The transparent layers are deposited onto the reflecting layer. For example 1, 2, 3, 4, 5, 6, 7, 8, 9 or 10 transparent layers—not including the protective layer—advantageously satisfy the formula $\lambda/2$ with respect to the optical thickness for each layer, whereby in particular each of these transparent layers is a double layer made up of two layers of thickness $\lambda/4$. The optical thickness of each transparent layer having the formula $\lambda/2$ may vary by ±40 nm. Preferred is one transparent layer or, also preferred are two, three or more transparent layers, which may be of the same or different materials, where each of the transparent layers has an optical thickness of $\lambda/2\pm40$ nm, and in particular, a double layer of thickness $2\cdot\lambda/4$. The protective layer, which is also transparent, is deposited on the above mentioned transparent layer or layers as the uppermost layer or as the layer on the surface. $\lambda$ corresponds to the intensity maximum of the wavelength of reflecting electromagnetic radiation.

The material of the transparent layers is of or contains e.g. oxides, nitrides, fluorides, sulphides etc. of alkali metals e.g. Li, Na, K, alkali-earth metals e.g. Mg, Ca, Sr, Ba, semi-metals such as Si, transition metals e.g. Sc, Ti, V, Cr, Mn, Fe, Co, Ni, Y, Zr, Nb, Te, Ru, Pd, Hf, Ta, W, Re, Os, Ir, Pt, lanthanides e.g. La, Ce, Pr, Nd, Pm, Dy, Yb, Lu etc. One may mention here by name $SiO_x$ where x stands for 1.1 to 2.0, preferably 1.8, $Al_2O_3$, $MgF_2$, $TiO_2$, $B_2O_3$, Be-oxide, ZnO, $SnO_2$, Indium-tin-oxide (ITO), CdS, CdTe and hafnium- and zirconium-oxides. Advantageously, at least one of the transparent layers, with the exception of the protective layer, exhibit other materials than the protective layer itself. One, several or all transparent layers of optical thickness $\lambda/2\pm40$ nm may be double layers each of two layers of optical thickness of $\lambda/4$. The double layers, each of two layers of optical thickness $\lambda/4$ are to advantage of a low refractive index layer of optical thickness $\lambda/4$ and a high refractive index of optical thickness $\lambda/4$. The double layers are—especially to advantage—made up of two layers namely a first and a second layer of optical thickness $\lambda/4$ i.e. a low refractive index first layer of optical thickness $\lambda/4$ of $SiO_2$ or $MgF_2$ and a high refractive index second layer of optical thickness $\lambda/4$ of Ti-oxide or Ti,Pr-oxide.

Accordingly, in order to reinforce the degree of refraction as a result of parallel reflection at the phase boundary, one, two or more transparent layers of optical thickness $\lambda/2$ may be formed out of two transparent layers of optical thickness $\lambda/4$ using materials with different refractive indices. The individual transparent layers with an optical thickness $\lambda/4$ are typically from 30 nm, preferably from 40 nm, to 200 nm thick. One example of a transparent layer with an optical thickness of $\lambda/2$ made up of two layers of optical thickness $\lambda/4$ may contain a low refractive index layer of optical thickness $\lambda/4$ made of $SiO_2$, $MgF_2$ etc. and a high refractive index layer of optical thickness $\lambda/4$ of Ti-oxide, Ti,Pr-oxide, tantalum oxide etc.

Preferred are also reflection layer structures b) made up of a reflecting layer, on top of that one or two transparent layers, each of these transparent layers in the form of double layers $\lambda/4$ and therefore of optical thickness $\lambda/2$, and a protective layer which lies on the surface of the transparent layers, and out of a silicon oxide having the general formula $SiO_x$, where x stands for a number between 1.1 to 2, or out of aluminium oxide, whereby the thickness of the protective layer is 3 nm or greater.

Preferred are also reflection layer structures comprising a reflecting layer, on top of this a transparent layer of optical thickness $\lambda/4$ of low refractive index and on top of this a transparent layer of optical thickness $\lambda/4$ of high refractive index and a protective layer which lies on the surface made of a silicon oxide having the general formula $SiO_x$, where x stands for a number of 1.1 to 2.0, or aluminium oxide having a thickness of 3 nm or more. A even higher degree of reflection may be obtained using a plurality of double layers $2\cdot\lambda/4$ alternating with low and high refractive indices.

Accordingly, the present invention includes reflectors containing a reflector body, if desired a pre-treatment layer which is deposited on the reflector body or is formed out of this itself, deposited on top of that the functional coating, and on top of that the reflection layer structure. The reflection layer structure itself exhibits the reflection layer, which as a rule lies on the functional layer. In one version one or more transparent layers of optical thickness $\lambda/2$, which in turn are covered by the protective layer, may lie on the reflecting layer. Consequently, the layer described as the protective layer always represents that layer on the reflector which lies outermost, is free and directly exposed to mechanical influences.

All or individual layers in the refection layer structure b) may e.g. be deposited onto the reflector body or onto a pre-treatment layer thereon e.g. by gas or vapour-phase deposition in vacuum (physical vapour deposition, PVD), by thermal vaporisation, electron beam vapour deposition, with and without the assistance of ionisation, by sputtering, in particular magnetron sputtering, by plasma-polymerisation or chemical gas phase deposition (chemical vapour deposition, CVD) with and without the assistance of plasma. Other methods of deposition are lacquering or immersion using solutions manufactured in the sol-gel process followed by drying, flame-pyrolitic process or flame coating using $SiO_2$. It is also possible e.g. to suppliment PVD-layers by flame-coating with $SiO_2$.

The reflecting layer or reflecting layer structure may be deposited on the surface e.g. in a process structure which includes—possibly degreasing and cleaning—charging the item with the surface to be coated into a vacuum unit, cleaning e.g. by means of sputtering, glowdischarge etc., in a first step deposition of a light-reflecting, in particular metallic layer, and in a second step deposition of a transparent layer and if desired in a third, fourth etc. step deposition of a second, third etc. transparent layer and discharging the coated item from the vacuum.

The reflecting layer may also be produced in an electrolytic or wet chemical process. The transparent layers and thereby in particular the protective layer may be present as gel-films which are produced in a sol-gel process. The transparent layers and thereby in particular the protective layer may also be produced in a flame-pyrolitic manner. It is also possible to employ different processes for the individual layers in a layer structure.

For example in the case of rolled products such as foils, strips or sheets or in the case of laminates with an aluminium layer, individual or advantageously all coatings are deposited or precipitated in a continuous manner, as a rule using the so called strip or continuous processes, also known as coil-coating. For the production of the pre-treatment layer e.g. the method of anodic oxidation of aluminium may be employed. Also the functional coating a) e.g. a sol-gel layer may be deposited in a continuous process, whereby the sol is deposited onto the surface to be coated by immersion, spraying etc. or in coil coating and subsequently dried or hardened by radiation and/or heat treatment in the continuous heat treatment furnace. Finally, the reflection layer b) may be deposited by vapour deposition, sputtering etc in each case in vacuum etc.

The structure of reflection layers b) on the reflector body serves in particular the reflection of electromagnetic radiation or energy in the form of waves and/or particles, usefully for the reflection of radiation with wavelengths in the optical range and preferably visible light, in particular those waves with wavelengths between 400 and 750 nm.

The reflectors according to the invention with surfaces that bear the reflection layer structure according to the invention exhibit excellent reflecting properties e.g. for electromagnetic radiation and in particular electromagnetic radiation in the optical range. The optical range includes e.g. the infra-red radiation, the visible light range, the ultra-violet light range etc. The preferred field of application is the range of electromagnetic radiation and thereby the visible light range.

The reflection of radiation may, depending on the surface, be directional, scattered or a combination thereof. Accordingly, the reflectors according to the invention are suitable as reflectors such as reflectors e.g. for radiation sources or optical equipment. Such radiation sources are e.g. lamps, such as lamps for workplaces, primary lighting, secondary lighting, strip lighting, light guiding elements, lighted ceilings, light deflecting lamellae or thermal radiators. The reflectors may e.g. also be mirrors or interior mirrors of optical equipment, lamps or thermal radiators.

The reflector layer structure b) on the reflecting body leads in particular to reflectors whose coated surfaces exhibit a total reflection—measured acc. to DIN 5036—usefully of 90% and more, in particular from 94 % to 96 % and more.

The reflectors according to the present invention exhibit e.g. excellent resistance to wiping and also hardness. The resistance to wiping can be measured e.g. acc. to DIN 58196. In summary according to DIN 58196 a sample is tested using a felt type stamp applied with a force of 4.5N (corresponds approx. to 450 g) over a stretch of 120 mm 100 times within 74 seconds (1.3 Hz). The test cycle is repeated 20, 50 and 80 times; the sample is then evaluated. On a scale of 1 to 5 the value 1 represents no damage to the surface, 2 means traces of rubbing can be recognised on viewing under special lighting in a light box, 3 means traces of rubbing can be recognised on viewing in daylight, 4 means pronounced traces of rubbing are to be seen over the whole area and 5 means very pronounced traces of rubbing are to be seen over the whole surface area. The reflectors, for example in the form of foils, strips or sheets can be shape formed and namely such that it is hardly possible to detect cracks. The reflectors according to the invention exhibit good protection against mechanical effects such as mechanical damage e.g. scratch hardness or wear and thereby in particular a high resistance to wiping. Mechanical damage can occur e.g. as a result of cleaning the surface i.e. the reflecting layers, due to dust, sand and the like which becomes trapped between the cleaning device and the surface or due to the cleaning equipment itself such as dusters, wipers, brushes etc.

The scope of the present invention includes also the use of reflectors containing a surface that is resistant to mechanical attack having high total reflectivity for reflection of radiation in the optical range i.e. daylight and artificial light, thermal radiation, visible light, ultra-violet light etc. Of particular importance is the use of the reflectors for reflecting visible light, in particular daylight or artificial light, including ultra-violet light. The reflectors according to the invention are e.g. suitable as reflectors or lighting elements in lighting or illumination technology such as e.g. reflectors in lamps for workplaces where display units with screens are in use, primary lighting, secondary lighting, strip lighting, light guiding elements, lighted ceilings or as light deflecting lamellae etc.

$SiO_2$ layer. In the examples used for comparison purposes the protective layer was missing in each case. All samples were subjected to the wipe test acc. to DIN 58196 and the resistance to wiping evaluated. The samples according to the invention were evaluated after 50 test cycles each of 100 strokes. The comparison samples degenerated so fast during the wipe test that the number of cycles is given at which a value of 3 or higher, up to 5, was reached. The testing arrangements and the values achieved are presented in the following table. From the following table it can be seen that the protective layer leads to a considerable improvement in the resistance to wiping. After interrupting the test at 50 cycles, each of 100 strokes, all of the samples according to the invention still exhibit an undamaged surface with a value of 1. The samples used for comparison on the other hand had fallen significantly and already after less than 10 or 20 cycles the samples were so damaged that the value of 3 or worse had been reached.

TABLE

| Sample No. | Substrate | Pre-treatment | Lacquer | Reflection layer structure | Protective layer | Wipe-test: number of test cycles = value |
|---|---|---|---|---|---|---|
| 1 | Al99.7 | anodised | Sol-gel[1] | $Al/SiO_2/TiO_2$ | $SiO_2$ | 50x = 1 |
| Comparison 1 | Al99.7 | anodised | Sol-gel[1] | $Al/SiO_2/TiO_2$ | none | Less than 10x |
| 2 | Al99.9 | degreased | Sol-gel[1] | $Al/SiO_2/TiO_2$ | $SiO_2$ | 50x = 1 |
| Comparison 2 | Al99.9 | degreased | Sol-gel[1] | $Al/SiO_2/TiO_2$ | none | Less than 20x |
| 3 | AlMgCu | degreased | $SiO_2/TiO_2$ Sol-gel mixture | $Al/SiO_2/TiO_2$ | $SiO_2$ | 50x = 1 |
| Comparison 3 | AlMgCu | degreased | $SiO_2/TiO_2$ Sol-gel mixture | $Al/SiO_2/TiO_2$ | none | Less than 10x |
| 4 | AlMgCu | degreased | Sol-gel on polysiloxane basis | $Al/SiO_2/TiO_2$ | $SiO_2$ | 50x = 1 |
| Comparison 4 | AlMgCu | degreased | Sol-gel on polysiloxane basis | $Al/SiO_2/TiO_2$ | None | Less than 20x |
| 5 | Al99.7 | Barrier layer 150 nm $Al_2O_3$ | Sol-gel[1] | $Al/SiO_2/TiO_2$ | $SiO_2$ | 50x = 1 |
| Comparison 5 | Al99.7 | Barrier layer 150 nm $Al_2O_3$ | Sol-gel[1] | $Al/SiO_2/TiO_2$ | none | Less than 20x |

[1] with organic content

EXAMPLES

Various samples for testing made of aluminium or its alloys were pre-treated by anodising, some only degreased, and subsequently coated with a lacquer. A reflecting layer structure was deposited onto the lacquer using a PVD process. The reflecting layer structure comprised in series: a 50 nm thick reflecting aluminium layer onto which was deposited first a silicon oxide layer with an optical thickness of $\lambda/4$ and after that a titanium oxide layer having an optical thickness of $\lambda/4$. In accordance with the invention the protective layer was deposited onto the outermost surface in a further PVD process, this in the form of a 5 to 10 nm thick

What is claimed is:

1. A reflector with high total reflection, and resistant to mechanical stress, containing a reflector body made of a rolled metal sheet on which are superimposed:

(a) a functional coating comprising a gel film, varnish or polymer with a thickness ranging from 0.5 to 20 µm, the functional coating overlying and being directly on the reflector body; and (b) a reflection layer structure composed of (i) a reflecting metallic layer overlying and being directly on the functional coating; (ii) a plurality of transparent layers overlying the reflecting metallic layer, one of the transparent layers being directly on the reflecting metallic layer, and each of the other transparent layers overlying and being directly on one of the transparent layers, and (iii) a scratch proof protective layer overlying and being directly on the transparent layer furthest away from the reflecting metallic layer, surface of the protective layer away from the reflector body has no layer thereon, the protective layer comprises a silicon oxide of formula $SiO_x$ where x represents a number from 1.1 to 2.0 or aluminum oxide of formula $Al_2O_3$, the protective layer has a thickness of 3 nm to 20 nm, the protective layer, being on the surface of the reflector away from the reflector body, protects underlying layers against mechanical damage, and the protective layer exhibits no surface damage in wipe test according to DIN 58196 after 50 test cycles each of 100 wiping strokes.

2. The reflector according to claim 1, wherein the protective layer is a silicon oxide having the general formula $SiO_x$ where x is a number from 1.1 to 2.0.

3. The reflector according to claim 1, wherein the protective layer is a silicon oxide having the general formula $SiO_x$ where x is the number 1.8.

4. The reflector according to claim 1, wherein the protective layer is a gel film deposited in a sol-gel process or a thin film deposited in vacuum or a plasma deposited thin film or a film created in a flame-pyrolitic manner.

5. The reflector according to claim 1, wherein the reflection layer structure comprises a metallic reflecting layer with 1, 2, 3, 4, 5, 6, 7, 5, 9 or 10 transparent layers of optical thickness $\lambda/2 \pm 40$ nm arranged thereon, where the transparent layers are double layers in each case two layers of thickness $\lambda/4$, and deposited thereon the protective layer.

6. The reflector according to claim 5, wherein the double layers, each of two layers, are of thickness equal to $\lambda/4$ and comprise a low refractive index layer of thickness $\lambda/4$ and a high refractive index layer of thickness $\lambda/4$.

7. The reflector according to claim 6, wherein the double layers, each of two layers, are of thickness equal to $\lambda/4$ and comprising a low refractive index layer of thickness $\lambda/4$ or of $SiO_2$ or $MgF_2$ and a high refractive index layer of thickness $\lambda/4$, or of titanium oxide, Ti,Pr-oxide or tantalum oxide.

8. A process comprising preparing the reflector according to claim 1 as a reflector or a light-guiding element for artificial light and daylight.

9. A combination of a reflector according to claim 1, in a lamp for a workplace where a display unit with a screen is in use, primary lighting, secondary lighting, strip lighting, lighted ceiling or as light deflecting lamella.

10. A reflector with high total reflection, and resistant to mechanical stress, containing a reflector body made of a rolled aluminum sheet on which are superimposed:

(a) a functional coating overlying the reflector body, the functional coating being anodically oxidized aluminum formed directly out of the aluminum lying on surface of the reflector body, of thickness 10 to 500 nm, and a gel-film, lacquer or polymer of thickness 0.5 to 20 μm overlying and being directly on the anodically oxidized aluminum; and (b) a reflection layer structure composed of (i) a reflecting metallic layer overlying and being directly on the functional coating, (ii) a plurality of transparent layers overlying the reflecting metallic layer, one of the transparent layers being directly on the reflecting metallic layer, and each of the other transparent layers overlying and being on one of the transparent layers, and (iii) a scratch-proof protective layer overlying and being directly on the transparent layer furthest away from the reflecting metallic layer, and surface of the protective layer away from the reflecting body has no layer thereon, the protective layer comprises a silicon oxide silicon-oxide of formula $SiO_x$ where x represents a number from 1.1 to 2.0, or aluminum oxide of formula $Al_2O_3$, the protective layer has a thickness of 3 nm to 20 nm, the body, protect underlying layers against mechanical damage, and the protective layer exhibits no surface damage in wipe test according to DIN 58196 after 50 test cycles, each of 100 wiping strokes.

11. The reflector according to claim 10, wherein the protective layer is a silicon oxide having the general formula $SiO_x$ where x is a number from 1.1 to 2.0.

12. The reflector according to claim 10, wherein the protective layer is a silicon oxide having the general formula $SiO_x$ where x is the number 1.8.

13. The reflector according to claim 10, wherein the protective layer is a gel film deposited in a sol-gel process or a thin film deposited in vacuum or a plasma deposited thin film or a film created in a flame-pyrolitic manner.

14. The reflector according to claim 10, wherein the reflection layer structure comprises a metallic reflecting layer with 1, 2, 3, 4, 5, 6, 7, 5, 9 or 10 transparent layers of optical thickness $\lambda/4 \pm 40$ nm arranged thereon, where the transparent layers are double layers in each case two layers of thickness $\lambda/4$, and deposited thereon the otective layer.

15. The reflector according to claim 14, wherein the wavelength of the reflected electromagnetic radiation lies in the range of visible light.

16. The reflector according to claim 14, wherein the wavelength of the reflected electromagnetic radiation lies between 400 and 750 nm.

17. The reflector according to claim 14, wherein the double layers, each of two layers, are of thickness equal to $\lambda/4$ and comprise a low refractive index layer of thickness $\lambda/4$ and a high refractive index layer of thickness $\lambda/4$.

18. The reflector according to claim 17, wherein the double layers, each of two layers, are of thickness equal to $\lambda/4$ and comprising a low refractive index layer of thickness $\lambda/4$ or of $SiO_2$ or $MgF_2$ and a high refractive index layer of thickness $\lambda/4$, or of titanium oxide, Ti,Pr-oxide or tantalum oxide.

19. A process comprising preparing the reflector according to claim 10, as a reflector or a light-guiding element for artificial light and daylight.

20. A combination of a reflector according to claim 10, in a lamp for a workplace where a display unit with a screen is in use, primary lighting, secondary lighting, strip lighting, lighted ceiling or as light deflecting lamella.

21. The reflector according to claim 1, wherein the reflector body is composed of a rolled aluminum or aluminum alloy sheet.

22. The reflector according to claim 1, wherein the reflector structure (b) on the reflecting body provides the reflector whose coated surface exhibits a total reflection, measured according to DIN 5036, of 90 percent and more.

23. The reflector according to claim 22, wherein the coated surface of the reflector exhibits a total reflection, measured according to DIN 5036, of 94 to 96 percent.

24. The reflector according to claim 23, wherein the coated surface of the reflector exhibits a total reflection, measured according to DIN 5036, of 96 percent or more.

25. The reflector according to claim 10, wherein the reflector structure (b) on the reflecting body provides the reflector whose coated surface exhibits a total reflection, measured according to DIN 5036, of 90 percent and more.

26. The reflector according to claim 25, wherein the coated surface of the reflector exhibits a total reflection, measured according to DIN 5036, of 94 to 96 percent.

27. The reflector according to claim 26, wherein the coated surface of the reflector exhibits a total reflection, measured according to DIN 5036, of 96 percent or more.

* * * * *